June 9, 1942.   L. G. WOODSON   2,285,788
REFRIGERATING APPARATUS
Filed Aug. 2, 1940   2 Sheets-Sheet 2

Inventor
Lewis G. Woodson
By James P. Burns
Attorney

Patented June 9, 1942

2,285,788

UNITED STATES PATENT OFFICE 2,285,788

REFRIGERATING APPARATUS

Lewis Green Woodson, Birmingham, Ala.

Application August 2, 1940, Serial No. 349,779

4 Claims. (Cl. 62—5)

This invention relates to refrigerating systems of the absorption type and, more particularly, to novel apparatus for effecting circulation of absorption liquid in such systems.

The invention contemplates the provision of a closed tank intermediate the absorber and generator in a refrigerating system of the absorption type. Enriched absorption liquid flows from the absorber to the intermediate tank by gravity and this enriched liquid is then heated in the intermediate tank to increase its temperature and consequent pressure. During that portion of the cycle of operation of the system in which the enriched absorption liquid is being heated in the intermediate tank, the supply of heat to the generator may be interrupted and means are provided to permit weak liquid from the generator to flow to the absorber to be enriched.

It is one of the primary objects of the invention to provide a refrigerating system of the intermittent absorption type, in which the frequency of the cycles of operation is increased to thereby render the operation of the system more continuous. Another important object of the invention is to provide an automatically-controlled system of the absorption type which involves simple and inexpensive apparatus and which can, therefore, be manufactured and supplied at low cost. Still another important object of my invention is to provide a refrigerating apparatus of the absorption type which permits a much more efficient utilization of heat than has heretofore been possible in this type of refrigerating system. Other objects and advantages of my invention will be in part obvious and in part specifically referred to hereinafter.

For a complete understanding of my invention, reference is made to the accompanying drawings, wherein.

Figure 1:
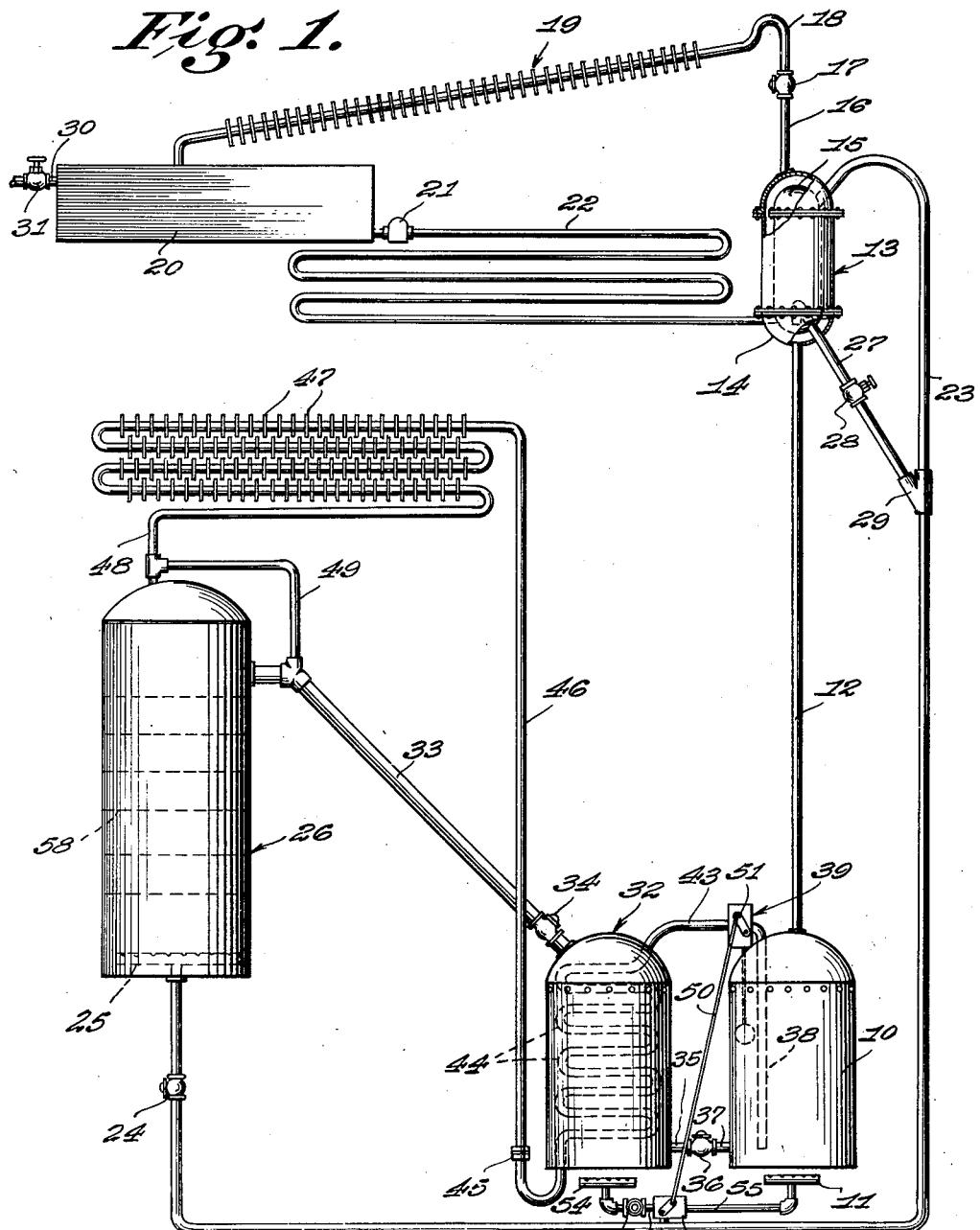
Figure 1 is a more or less diagrammatic view of a refrigerating system constructed in accordance with the preferred embodiment of my invention.

Referring to the drawings and, more particularly, to Figure 1 thereof, the reference numeral 10 designates a generator adapted to hold a solution of refrigerant, such as ammonia, in an absorption liquid, such as water. The generator 10 is adapted to be heated by any suitable means, such as a gas burner 11. Refrigerant gas expelled from the absorption liquid passes through a pipe 12 to a rectifier which is designated generally by the reference numeral 13. The rectifier 13 consists of an outer shell 14 into which the pipe 12 discharges and an inner shell 15 which is spaced from the walls of the outer shell by any suitable means. After passing through the outer shell 14 of the rectifier 13, the refrigerant gas passes through a pipe 16, a check valve 17, and a pipe 18 to an air condenser 19. The refrigerant gas is condensed to a liquid in the condenser 19 and passes to a storage tank 20. From the storage tank 20, the refrigerant liquid passes through an expansion valve 21 to evaporating coils 22 disposed within the zone desired to be refrigerated.

From the evaporating coils 22, the refrigerant gas passes to the inner shell 15 of the rectifier 13, thence through the pipe 23 to a back pressure check valve 24 to a perforated pipe 25 disposed in the bottom of the absorber, which is designated generally by the reference numeral 26. In the event that liquid collects within the inner shell 15 of the rectifier 13, this liquid may be withdrawn through the pipe 27 which may be controlled by means of a hand valve 28. As shown in Figure 1, the pipe 27 connects with the pipe 23 by means of the bifurcated coupling 29. The storage tank 20 may be provided with an inlet 30 controlled by a hand valve 31 for the purpose of charging or recharging the assembly.

Except as will be hereinafter specifically pointed out, the portions of the assembly described above are more or less conventional and, for that reason, further detailed explanation is believed unnecessary.

The reference numeral 32 designates generally a closed tank which is interposed intermediate the absorber 26 and the generator 10. The closed tank 32 is hereinafter referred to as the intermediate tank. A pipe 33 having a check valve 34 therein connects the upper portion of the absorber 26 with the upper portion of the intermediate tank 32. The check valve 34 permits flow of strong liquid by gravity from the absorber 26 to the intermediate tank 32 but prevents any flow of liquid in the opposite direction. The lower portion of the intermediate tank 32 is connected to the lower portion of the generator 10 by means of pipe 35, check valve 36, and pipe 37. The check valve 36 permits flow of strong liquid from the intermediate tank 32 to the generator 10, but prevents any flow in the opposite direction.

Figure 2:
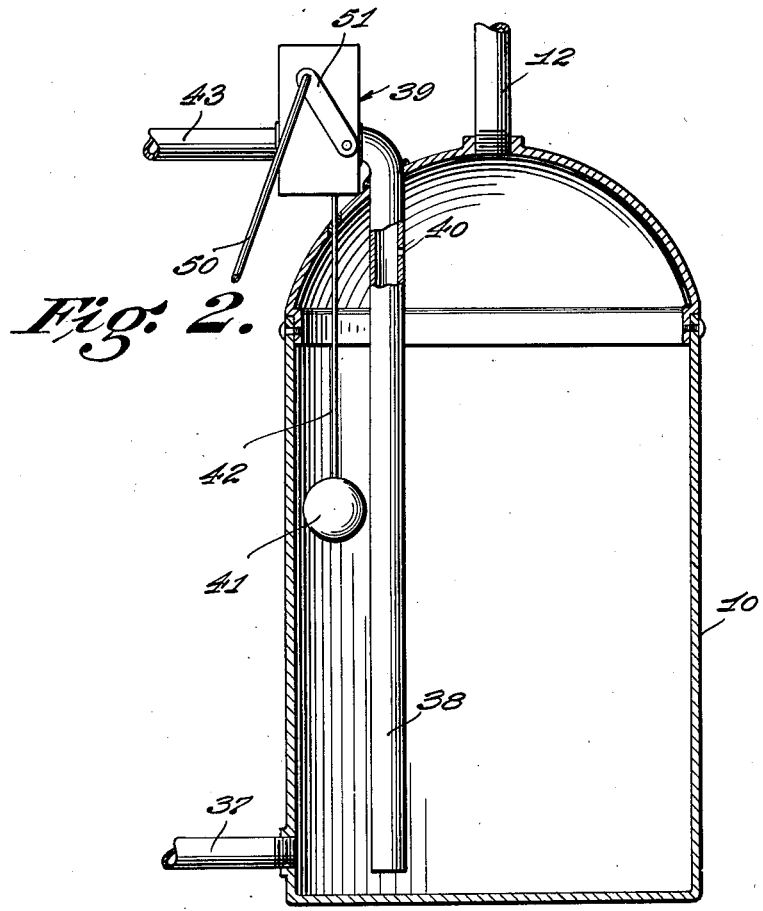
Figure 2 is an enlarged sectional view of the generator.
Figure 3:
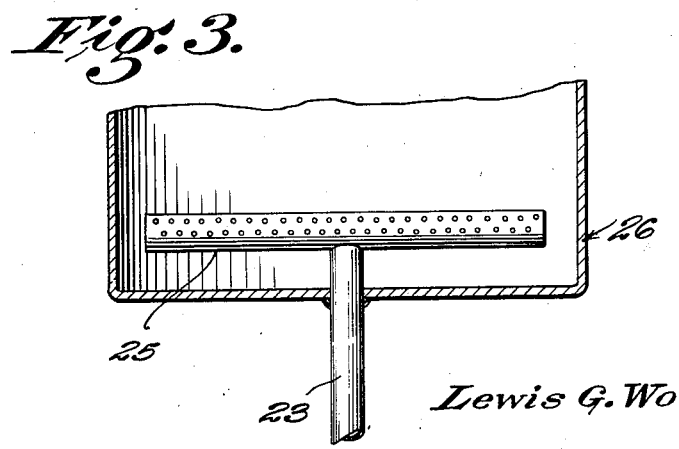
Figure 3 is an enlarged sectional view showing the details of the lower portion of the absorber.

As is best shown in Figure 2, a pipe 38 extends from a point adjacent the bottom of the generator 10 through the top of the generator to a valve arrangement designated by the reference numeral 39. Near the upper end thereof, but within the generator 10, the pipe 38 is provided with a minute vent 40, the purpose of which will be hereinafter explained.

The valve 39 is preferably of a type which is opened and closed by variations in temperature. For this purpose, the valve 39 is provided with a bulb 41, which is disposed inside the generator 10 and connected to the valve by means of a hollow tube 42. By this arrangement, the bulb 41 is subjected to the temperature within the generator 10 and the valve is adapted to be opened in response to a predetermined temperature within the generator, and to be closed when a predetermined lower temperature obtains within the generator.

Connected to the outlet side of the valve 39 is a conduit 43 which extends into the intermediate tank 32 and has coils 44 formed therein in heat exchange relationship with liquid in the intermediate tank 32. The conduit 43 emerges from the bottom of the intermediate tank 32 and is provided with a restricted orifice 45. The orifice 45 has a diameter preferably approximately one-fourth that of the inside diameter of the conduit 43 and the coils 44 in order to restrict the rate of flow of fluid through the coils 44.

From the orifice 45 a pipe 46 extends to heat exchange coils 47, which are preferably exposed to the atmosphere. The heat exchange coils 47 are connected to the top of the absorber 26 by means of a pipe 48. If desired, a pipe 49 may connect the pipe 48 to the pipe 33 in order to facilitate gravity drainage of strong liquids from the absorber 26 to the intermediate tank 32.

The valve 39 is adapted to actuate a linkage 50 by means of a crank arm 51 on the valve 39 to control a valve 52 in the line 53 for supplying fuel to the burner 11 which is intended to intermittently heat the generator 10. As will be more fully explained hereinafter, it is sometimes advisable to also heat the liquid within the intermediate tank 32 and for this purpose, I provide a burner 54. The valve 52 is of the multiple outlet type and, depending upon its position, as governed by the valve 39, may supply fuel to the burner 11 through the pipe 55 or to the burner 54 through the pipe 56. In those cases in which it is deemed unnecessary to heat the liquid within the intermediate tank 32, the burner 54 may be shut off from its fuel supply by means of the hand valve 57. The hand valve 57 may also be adjusted to control the amount of fuel which is supplied to the burner 54 and consequently the extent of heating of the liquid within the intermediate tank 32.

The operation of the apparatus as an intermittent type system will now be described. At the beginning of any complete cycle of operation the generator 10 will be at least partially filled with relatively cool, strong liquid, the burner 11 will have begun to supply heat to this liquid, and the valve 39 will be closed. As the temperature within the generator 10 rises, refrigerant gas will be expelled through the pipe 12, the rectifier 13, the pipe 16, check valve 17, and pipe 18 to the condenser 19. The refrigerant gas will be condensed to a liquid within the condenser 19 and will flow by gravity into the storage tank 20. The refrigerant liquid will be expanded through the expansion valve 21 and will evaporate within the evaporating coils 22, thus effecting the desired refrigerant gas which has evaporated within the coils 22 will enter the inner shell 15 of the rectifier 13 and will assist, by heat exchange relationship, in cooling the hot gas entering the outer cell 14 of the rectifier through the pipe 12. The refrigerant gas will escape from the inner shell 15 of the rectifier through the pipe 23 and will pass through the back pressure check valve 24 to the perforated pipe 25 within the absorber 26. From the perforated pipe 25, the refrigerant gas will bubble upwardly through the liquid within the absorber 26 and be absorbed.

After the temperature of the liquid within the generator 10 has risen to a certain value (in the event that ammonia and water are used this temperature will be approximately 240°), most of the refrigerant gas will have been expelled from the generator and only relatively weak liquid will remain. The valve 39 should be calibrated to open at this optimum maximum temperature. The opening of the valve 39 will also actuate the valve 52 to cut off the supply of fuel to the burner 11 to thereby discontinue the heating of the generator 10. In the first instance, it will be assumed that the hand valve 57 is closed so that burner 54 will remain inactive.

The high temperature and consequent high pressure within the generator 10 will cause flow of the weak liquid therein upwardly through the pipe 38, through the valve 39, and the conduit 43 to the coils 44 within the intermediate tank 32 which is filled with strong liquid. Since the coils 44 are in heat exchange relationship with the strong liquid within the intermediate tank 32, this strong liquid will be heated and the weak liquid which has left the generator 10 will be substantially cooled. The weak liquid will then pass through the orifice 45, the pipe 46, and the cooling coils 47, where it is further cooled, and into the absorber 26.

Since the burner 11 has been rendered inactive and hot liquid is flowing out of the generator 10, the temperature within the generator will gradually diminish and the pressure therein will consequently also diminish. At the time that the generator is cooling, the temperature of the liquid within the intermediate tank 32 is gradually increasing, due to its heat exchange relationship with the hot liquid in the coils 44. With the increase in temperature of the strong liquid in the intermediate tank 32, the pressure will also increase, since the check valve 34 prevents flow to the absorber. As this process continues, there will ultimately be reached a condition in which the pressure within the intermediate tank 32 slightly exceeds the pressure within the generator 10. When this condition is reached, the check valve 36 will open and the strong liquid within the intermediate tank 32 is free to flow into the generator 10 to thereby recharge the generator with strong liquid.

The valve 39 should be calibrated to close when the bulb 41 is contacted by the strong liquid entering the generator from the intermediate tank 32, the temperature of which is, of course, considerably below the temperature at which the valve was calibrated to open. When the valve 39 closes, the valve 52 is opened in a manner to permit reignition of the burner 11. After the transfer of strong liquid from the intermediate tank 32 to the generator 10 has been completed, the check valve 36 closes. Since heat is no longer being added to the intermediate tank 32, this tank gradually cools and the pressure therein decreases sufficiently to permit a new supply of strong liquid to flow by gravity from the absorber 26 through the pipe 33 into the intermediate tank 32.

There is thus provided a means of utilizing the heat of the weak liquid leaving the generator to preheat the strong liquid with which the generator is to be recharged. The cooling of the generator 10 is accompanied by a heating and consequent pressure increase of the strong liquid within the intermediate tank 32, which enables the generator to be recharged much more quickly and at a higher temperature than would otherwise be possible. This results not only in a more efficient utilization of heat, but also renders the frequency of the cycles of operation more rapid and the operation of the system thereby closely approaches the operation of a system of the continuous absorption type.

I have found that even after the generator has cooled, and the pressure therein has dropped sufficiently to permit recharging of the generator with strong liquid from the intermediate tank 32, certain of the metallic parts of the generator may still be sufficiently hot to cause a sudden evolution of gas pressure at the instant that the strong liquid enters the generator. This appears to result from the driving off of refrigerant gas when the strong liquid quenches the hot parts of the generator. Some means must be provided to discharge this gas pressure in order to prevent it from interfering with the flow of strong liquid into the generator. This is the purpose of the minute vent 40 in the upwardly extending pipe 38 in the generator. The vent 40 should be of such size as to permit the gradual escape of gas therethrough as strong liquid flows into the generator, but should not be sufficiently large to interfere with the discharge of weak liquid from the generator through the pipe 38.

Under certain conditions of operation, it may be found that the efficiency of the heat exchange relationship between the hot liquid in the coils 44 and the strong liquid within the intermediate tank 32 is not sufficient to adequately accelerate the transfer of strong liquids to the generator 10. In this event, the hand valve 57 may be opened so that upon closing of the valve 39, the multiple outlet valve 52 will direct fuel to the burner 54 in order that there may be a positive supply of external heat to the intermediate tank 32. It will be understood that both the burners 11 and 54 are provided with pilot lights in order to insure their ignition upon supply of fuel thereto in the manner well understood in the art.

My apparatus may be adapted, with very slight modifications, to function as a continuous type system. I have found that it is possible to cut off a portion of the lower end of the pipe 38 within the generator 10 and to thus transfer only a portion of the weak liquid to the absorber on each occasion that the valve 39 is opened. In this event the capacity of the intermediate tank 32 should be reduced to correspond with the amount of liquid evacuated from the generator 10 at each opening of the valve 39. There will thus be available in the intermediate tank 32 the proper volume of strong liquid to refill the generator 10 to the appropriate upper level. When the apparatus is modified in these respects, heat may be applied continuously to the generator 10. Under actual conditions of operation I have found that, upon opening of the valve 39, the pressure within the generator 10 decreases almost as effectively without interruption of the supply of heat and that the transfer of liquid takes place in an entirely satisfactory manner. It will be obvious that the means for supplying fuel to the burner 11 should be so modified as to permit uninterrupted heating of the generator 10 when the apparatus is to function as continuous type system.

My system is well adapted for use on motor vehicles, such as trucks and buses and when so used, the waste heat from the exhaust of an internal combustion engine can be used to heat the generator 10 and, if desired, the intermediate tank 32. In this case, a suitable valve for directing exhaust gases to the generator 10 or the intermediate tank 32 should be substituted for the valve 52 shown in the drawings. Since the principle of operation of the system would be unchanged by a substitution of heating means, no further detailed description is believed necessary.

In the event that the system is used on motor vehicles, it will be subject to certain inevitable vibrations and, for such use, I prefer to provide the absorber 26 with a plurality of perforated baffle plates 58 to prevent splashing of the liquid within the absorber.

Although I have specifically mentioned water as the absorption liquid and ammonia as the refrigerant gas, it will be obvious that any other suitable refrigerant gas and absorption liquid may be used. I have shown in the drawings and described in the specification a number of valves. It will be appreciated that these valves have been described by way of example only and that any other valves suitable for accomplishing the same purpose may be substituted. The tank 32 is shown in the drawings and described in the specification as intermediate the absorber and generator, but it will be appreciated that this refers to the position of the tank with respect to the flow of fluid between the absorber and generator and need not necessarily refer to the relative location of the tank 32.

Having thus described my invention, I claim:

1. In a refrigerating apparatus of the intermittent absorption type, a generator, means for heating said generator, an absorber, a closed tank intermediate said generator and said absorber, a pipe having a one-way valve therein connecting said absorber to said intermediate tank to permit flow of strong liquid to said intermediate tank, a conduit extending from said generator into heat exchange relationship with the strong liquid in said intermediate tank, means responsive to a predetermined maximum temperature of the liquid in said generator to render inactive said generator heating means and to permit flow of weak liquid from said generator through said conduit to thereby gradually elevate the temperature and consequent pressure of the strong liquid in said intermediate tank, means for conducting weak liquid from said conduit to said absorber, and a second pipe having a one-way valve therein connecting said intermediate tank with said generator to permit flow of strong liquid to said generator upon decrease of pressure therein.

2. In a refrigerating apparatus of the intermittent absorption type, a generator, means for heating said generator, an absorber, a closed tank intermediate said generator and said absorber, a pipe having a one-way valve therein connecting said absorber to said intermediate tank to permit flow of strong liquid to said intermediate tank, a conduit extending from said generator into heat exchange relationship with strong liquid in said intermediate tank, means operative upon a predetermined maximum temperature in said generator to render inactive said generator heating means and to permit flow of weak liquid from said generator through said conduit into heat exchange relationship with strong liquid in said intermediate tank to thereby increase the temperature and consequent pressure of the strong liquid in said intermediate tank, a pipe permitting one-way flow of strong liquid from said intermediate tank to said generator upon cooling and consequent pressure decrease in said generator, and means for conducting the weak liquid to said absorber after it has undergone heat exchange with the strong liquid in said intermediate tank.

3. In a refrigerating apparatus of the intermittent absorption type, a generator, means for intermittently heating said generator, an absorber, a closed tank intermediate said generator and said absorber, a pipe having a one-way valve therein connecting said absorber to said intermediate tank to permit flow of strong liquid to said intermediate tank, a second pipe having a one-way valve therein connecting said intermediate tank to said generator, means operative during inactivity of said generator heating means for transferring hot weak liquid from said generator through a heat exchange relationship with strong liquid in said intermediate tank and on to said absorber to thereby create a pressure differential between said intermediate tank and generator to induce flow of strong liquid from said intermediate tank through said second pipe to said generator.

4. In a refrigerating apparatus of the absorption type, a generator, means for heating said generator, an absorber, a closed tank intermediate said generator and said absorber, a pipe having a one-way valve therein permitting flow of strong liquid from said absorber to said intermediate tank, means operative upon the existence of a predetermined temperature in said generator for transferring hot weak liquid from said generator into heat exchange relationship with strong liquid in said intermediate tank to increase the temperature and consequent pressure of the strong liquid, a second pipe having a one-way valve therein permitting flow of strong liquid from said intermediate tank to said generator upon decrease of pressure in said generator, and means for conducting weak liquid from said intermediate tank heat exchange relationship to said absorber.

LEWIS G. WOODSON.